United States Patent
Zeng (10) Patent No.: US 10,628,218 B2
(45) Date of Patent: *Apr. 21, 2020

(54) METHOD FOR ALLOCATING PROCESSOR RESOURCES AND TERMINAL DEVICE

(71) Applicant: Guangdong Oppo Mobile Telecommunications Corp., Ltd., Dongguan, Guangdong (CN)

(72) Inventor: Yuanqing Zeng, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/119,151

(22) Filed: Aug. 31, 2018

(65) Prior Publication Data

US 2018/0365068 A1    Dec. 20, 2018

Related U.S. Application Data

(63) Continuation of application No. PCT/CN2017/086451, filed on May 27, 2017.

(30) Foreign Application Priority Data

May 31, 2016    (CN) .......................... 2016 1 0380674

(51) Int. Cl.
   *G06F 9/50*   (2006.01)
   *G06F 9/48*   (2006.01)
   *G06F 9/455*  (2018.01)

(52) U.S. Cl.
   CPC .............. *G06F 9/50* (2013.01); *G06F 9/455* (2013.01); *G06F 9/45533* (2013.01);
   (Continued)

(58) Field of Classification Search
   CPC combination set(s) only.
   See application file for complete search history.

(56) References Cited

U.S. PATENT DOCUMENTS

8,332,507 B2 * 12/2012 Wagh .................. G06F 9/505
                                            709/224
8,893,133 B2 * 11/2014 Arnold ................ G06F 9/4881
                                            718/102

(Continued)

FOREIGN PATENT DOCUMENTS

CN    102360246 A    2/2012
CN    102819458 A    12/2012
(Continued)

OTHER PUBLICATIONS

International search report issued in corresponding international application No. PCT/CN2017/086451 dated Aug. 24, 2017.
(Continued)

*Primary Examiner* — Charles M Swift
(74) *Attorney, Agent, or Firm* — Young Basile Hanlon & MacFarlane, P.C.

(57) ABSTRACT

A method for allocating processor resources and a terminal device are provided. The method includes the follows. Acquire n tasks running in parallel in a system, where n is an integer. The n tasks are classified into m task sets with each task set having a load level according to load capacities of the n tasks, where m is an integer. Demands of a current task set on processor resources are determined according to at least one of the number of tasks in the current task set and a load coefficient corresponding to a load level of the current task set. The demands on the processor resources are allocated for the current task set.

17 Claims, 4 Drawing Sheets

(52) U.S. Cl.
CPC ............ *G06F 9/45558* (2013.01); *G06F 9/48* (2013.01); *G06F 9/485* (2013.01); *G06F 9/4806* (2013.01); *G06F 9/4843* (2013.01); *G06F 9/4881* (2013.01); *G06F 9/4893* (2013.01); *G06F 9/5005* (2013.01); *G06F 9/505* (2013.01); *G06F 9/5011* (2013.01); *G06F 9/5016* (2013.01); *G06F 9/5022* (2013.01); *G06F 9/5027* (2013.01); *G06F 9/5055* (2013.01); *G06F 9/5061* (2013.01); *G06F 9/5083* (2013.01); *G06F 9/5044* (2013.01); *G06F 2209/503* (2013.01)

(56) References Cited

U.S. PATENT DOCUMENTS

| | | | |
|---|---|---|---|
| 9,811,434 B1* | 11/2017 | Wagner | G06F 11/301 |
| 2011/0061057 A1 | 3/2011 | Harris et al. | |
| 2012/0137295 A1* | 5/2012 | Soetemans | G06F 9/524 |
| | | | 718/100 |
| 2012/0180061 A1* | 7/2012 | Rao | G06F 9/5088 |
| | | | 718/104 |
| 2013/0227549 A1* | 8/2013 | Accapadi | G06F 9/45558 |
| | | | 718/1 |
| 2014/0007121 A1 | 1/2014 | Caufield et al. | |
| 2014/0025857 A1 | 1/2014 | Lippett | |
| 2014/0075024 A1* | 3/2014 | Koza | H04L 63/104 |
| | | | 709/225 |
| 2015/0007187 A1* | 1/2015 | Shows | G06F 9/5088 |
| | | | 718/104 |
| 2015/0186184 A1 | 7/2015 | Kim | |
| 2015/0212860 A1 | 7/2015 | Ali et al. | |
| 2015/0324234 A1* | 11/2015 | Chang | G06F 9/5033 |
| | | | 718/104 |
| 2016/0364263 A1* | 12/2016 | Cao | G06F 9/4818 |
| 2017/0255490 A1* | 9/2017 | Aberg | G06F 9/4881 |
| 2017/0322834 A1* | 11/2017 | de Sene | G06F 9/5083 |
| 2017/0329643 A1* | 11/2017 | Wang | H04L 29/06 |
| 2017/0337091 A1* | 11/2017 | Liu | G06F 9/5038 |
| 2018/0284869 A1* | 10/2018 | He | H04L 67/1008 |

FOREIGN PATENT DOCUMENTS

| | | |
|---|---|---|
| CN | 103235742 A | 8/2013 |
| CN | 103713956 A | 4/2014 |
| CN | 104182279 A | 12/2014 |
| CN | 104424101 A | 3/2015 |
| CN | 104572308 A | 4/2015 |
| EP | 2945064 A1 | 11/2015 |

OTHER PUBLICATIONS

Extended European search report issued in corresponding European application No. 17805801.2 dated Jan. 21, 2019.

* cited by examiner

METHOD FOR ALLOCATING PROCESSOR RESOURCES AND TERMINAL DEVICE

CROSS-REFERENCE TO RELATED APPLICATION(S)

This application is a continuation of International Application No. PCT/CN2017/086451, filed on May 27, 2017, which claims priority to Chinese Patent Application No. 201610380674.8, filed on May 31, 2016, the contents of both of which are hereby incorporated by reference in their entireties.

TECHNICAL FIELD

This disclosure relates to the field of terminal device technology, and particularly to a method for allocating processor resources and a terminal device.

BACKGROUND

With an increasing number of applications loaded in a terminal device, multiple applications can be processed simultaneously in the terminal device. Since processor resources of the terminal device are limited, appropriate allocation of the processor resources is required to ensure normal operation of multiple applications. Currently, terminal devices can be configured with integrated multi-core processors. Since a load capacity of each task run by the application is different from others, an operating system of the terminal device needs to allocate the processor resources for multiple tasks run by multiple applications simultaneously and appropriately.

SUMMARY

Implementations of the disclosure provide a method for allocating processor resources and a terminal device.

According to a first aspect, a method for allocating processor resources is provided. The method includes the follows.

Acquire n tasks running in parallel in a system, where n is an integer. The n tasks are classified into m task sets with each task set having a load level according to load capacities of the n tasks, where m is an integer. Demands of a current task set on processor resources are determined according to at least one of the number of tasks in the current task set and a load coefficient corresponding to a load level of the current task set. The demands on the processor resources are allocated for the current task set.

According to a second aspect, a terminal device is provided. The terminal device includes at least one processor and a computer readable storage, coupled to the at least one processor and is configured to store at least one computer executable instruction thereon which, when executed by the at least one processor, causes the at least one processor to carry out following actions.

Acquire n tasks running in parallel in a system, where n is an integer. The n tasks are classified into m task sets with each task set having a load level according to load capacities of the n tasks, where m is an integer. Demands of a current task set on processor resources are determined according to at least one of the number of tasks in the current task set and a load coefficient corresponding to a load level of the current task set. The demands on the processor resources are allocated for the current task set.

According to a third aspect, a non-transitory computer readable storage medium is provided. The non-transitory computer readable storage medium is configured to store at least one computer executable instruction thereon which, when executed by a computer, causes the computer to perform following actions.

Acquire n tasks running in parallel in a system, where n is an integer. The n tasks are classified into m task sets with each task set having a load level according to load capacities of the n tasks, where m is an integer. Demands of a current task set on processor resources are determined according to at least one of the number of tasks in the current task set and a load coefficient corresponding to a load level of the current task set. The demands on the processor resources are allocated for the current task set.

BRIEF DESCRIPTION OF THE DRAWINGS

To describe technical solutions in the implementations of the present disclosure more clearly, the following briefly introduces the accompanying drawings required for describing the implementations.

DETAILED DESCRIPTION

In order to enable those skilled in the art to better understand solutions of the present disclosure, technical solutions in implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "embodiment" or "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

According to implementations of the disclosure, a method for allocating processor resources is provided. In this method, acquire n tasks running in parallel in a system, where n is an integer. The n tasks are classified into m task sets with each task set having a load level according to load capacities of the n tasks, where m is an integer. Demands of a current task set on processor resources are determined according to at least one of the number of tasks in the current task set and a load coefficient corresponding to a load level of the current task set. The demands on the processor resources are allocated for the current task set. The task refers to a process or a thread of an application. The load level can be a high load level, a medium load level, or a low load level for example. The load level can be configured in other manners, which are not restricted herein.

In one implementation, the demands are the number of core processing units of the processor resources. The demands of the current task set on the processor resources can be determined as follows. Determine the demands of the current task set on processor resources by calculating a product of the number of the tasks in the current task set and the load coefficient corresponding to the load level of the current task set.

In one implementation, the demands on the processor resources for the current task set can be allocated as follows. Determine, for the current task set, a unit set having an operation level corresponding to the load level of the current task set, based on operation capabilities of processors, where the unit set includes core processing units with the operation level. The available core processing units that satisfy the demands of the current task set are allocated for the current task set, when the number of the available core processing units in the unit set is greater than or equal to the demands of the current task set.

In one implementation, the method further includes the follows. Determine first extra demands of the current task set on the processor resources with the operation level corresponding to the load level of the current task set, when the number of the available core processing units in the unit set is less than the demands of the current task set. Determine second extra demands on processor resources with other operation levels according to the first extra demands. Determine whether the processor resources with other operation levels satisfy the second extra demands. The processor resources with other operation levels are allocated for the current task set according to the second extra demands, based on a determination that the processor resources with other operation levels satisfy the second extra demands.

The term "satisfy" means that the processor resources are able to handle or carry the tasks in the current task set. For example, if the demands are expressed by the number of processing units and if the number of processing units of the processor resources (for example, the number of processing units included in a unit set of the processor resources) is greater than or equal to the demands of the current task set, that is greater than or equal to the number of processing units required by the current task set, then it indicates that the processor resources satisfy the demands. Similarly, if the demands are expressed by the total load capacity of the current task set and if the total load capacity of the processor resources is greater than or equal to the demands of the current task set, that is greater than or equal to the total load capacity required by the current task set, then it indicates that the processor resources satisfy the demands.

In one implementation, the second extra demands on the processor resources with other operation levels are determined according to the first extra demands as follows. Determine a ratio of a first operation coefficient corresponding to the operation level to a second operation coefficient corresponding to other operation levels. Determine a product of the ratio and the first extra demands as the second extra demands.

In one implementation, the demands are a total load capacity of the current task set. The demands of the current task set on the processor resources are determined as follows. Determine the total load capacity of the current task set according to load capacities of the tasks in the current task set and the number of the tasks in the current task set.

In one implementation, the demands on the processor resources are allocated for the current task set as follows. Determine, for the current task set, a unit set having an operation level corresponding to the load level of the current task set, based on operation capabilities of processors, where the unit set includes core processing units with the operation level. Determine a load capacity that can be carried by each core processing unit in the unit set. Determine a total load capacity that can be carried by the unit set according to the load capacity that can be carried by each core processing unit. Allocate, for the current task set, available core processing units that can carry the demands of the current task set, when the total load capacity that can be carried by the unit set is greater than or equal to the demands of the current task set.

In one implementation, the method further includes the follows. Determine first extra demands of the current task set on the processor resources with the operation level corresponding to the load level of the current task set, when the number of the available core processing units in the unit set is less than the demands of the current task set. Determine second extra demands on processor resources with other operation levels according to the first extra demands. Determine whether the processor resources with other operation levels satisfy the second extra demands. The processor resources with other operation levels are allocated for the current task set according to the second extra demands, based on a determination that the processor resources with other operation levels satisfy the second extra demands.

In one implementation, the second extra demands on the processor resources with other operation levels are determined according to the first extra demands as follows. Determine a ratio of a first operation coefficient corresponding to the operation level to a second operation coefficient corresponding to other operation levels. Determine a product of the ratio and the first extra demands as the second extra demands.

The following describes method implementations of the disclosure in detail.

Figure 1:
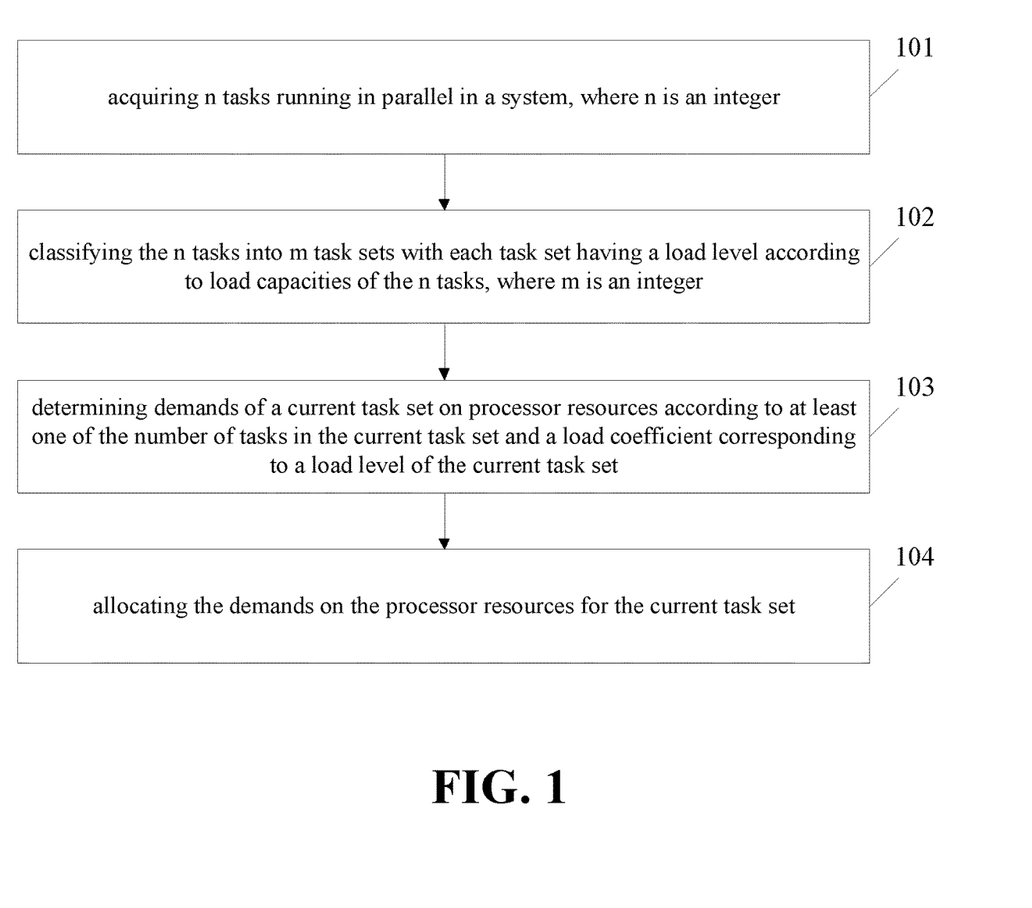
FIG. 1 is a schematic flow chart illustrating a method for allocating processor resources according to an implementation of the present disclosure.

FIG. 1 is a schematic flow chart illustrating a method for allocating processor resources according to an implementation of the present disclosure. As illustrated in FIG. 1, the method begins at block 101.

At block 101, n tasks running in parallel in a system are acquired, where n is an integer.

In one implementation, the terminal device acquires the n tasks running in parallel in the system. As one implementation, the terminal device may acquire the n tasks running in parallel in the system in real time, and may also acquire, in a period, the n tasks running in parallel during the period. The present disclosure is not limited thereto. Among them, the n tasks running in parallel in the system may represent n processes or threads of an application, and may also represent other tasks that a processor can handle. The n tasks can contain different load capacities, and can be generated by the same application or different applications.

At block 102, the n tasks are classified into m task sets with each task set having a load level according to load capacities of the n tasks, where m is an integer.

In one implementation, based on different load capacities of the n tasks, the n tasks are classified into the m task sets according to load capacities of the n tasks, with each task set having a load level. As one implementation, a mapping relationship table between load capacity ranges and load levels may be preset, where one load capacity range corresponds to one load level. The n tasks are classified according to the load capacities thereof. When a load capacity of a task falls within a load capacity range, a load level of the task can be determined, where the load level of the task corresponds to the load capacity range above. After determining load levels of the n tasks in the foregoing manner, tasks of the same load level may be selected to form a task set with the load level. The total number of tasks in the m task sets with each task set having a load level is n. Through the above manner, tasks that the system needs to process at the same time and the number of tasks at different load levels can be determined. Therefore, different processor resources can be allocated for different tasks based on different load levels.

At block 103, demands of a current task set on processor resources are calculated according to the number of tasks in the current task set and a load coefficient corresponding to a load level of the current task set.

In one implementation, after the m task sets with each task set having a load level are determined, the demands of the current task set on processor resources are determined according to the number of the tasks in the current task set and the load coefficient corresponding to the load level of the current task set. As one implementation, different load levels correspond to different load coefficients, such that the demands of the current task set on processor resources can be calculated according to the load coefficient and the number of the tasks in the current task set. The processor resources described in the implementation of the present disclosure may be central processing units (CPUs) or graphics processing units (GPUs), which can include core processing units integrated in the processor. The core processing units with different operation capabilities will have different load capacities for operation, that is, the stronger the operation capability, the larger the load capacities for operation. The processor resources can include multiple processors, and multiple core processing units may be integrated in each processor. The core processing units may have the same operation capability or different operation capabilities.

The following describes an example in which three load levels are configured. The three load levels are a high load level, a medium load level, and a low load level. Tasks with the high load level require relatively more processor resources; for example, they need to be processed by a single core processing unit. Accordingly, tasks with the medium load level require relatively medium processor resources; for example, one or two tasks are allowed to share a single core processing unit; and tasks with the low load level require relatively less processor resources; for example, multiple tasks are allowed to share a single core processing unit. The above-mentioned core processing units may have the same operation capability. Alternatively, core processing units allocated to the tasks with the high load level have a high operation capability, that is, have a high operation level; and core processing units allocated to the tasks with the medium load level or the low load level have a medium operation capability or a low operation capability, that is, have a medium operation level or a low operation level.

For example, a load coefficient corresponding to the high load level may be 1, indicating that each task requires a single core processing unit for processing; a load coefficient corresponding to the middle load level may be 0.6; a the load coefficient corresponding to the low load level may be 0.2. In this way, the processor resources that the current task set required are determined according to the load coefficient corresponding to the load level of the current task set and the number of the tasks in the current task set. For example, processor resources that a task set with the high load level required are determined as 1*the number of the tasks in the task set with the high load level.

In addition, other coefficients may be used to further determine the processor resources required. For example, according to different load capacities of different tasks, different weight values of different tasks are determined; based on this, a total weight value of the current task set can be calculated. According to the total weigh value and the load coefficient and the number of the tasks in the current task set, the demands of the current task set on the processor resources are determined. The disclosure is not particularly restricted.

At block 104, the demands on the processor resources are allocated for the current task set.

In one implementation, after demands of task sets with different load levels on processor resources are calculated, the demands on the processor resources are allocated for the task sets with different load levels. As one implementation, the tasks with the high load level will be allocated first, allocating core processing units with the high operation capability for the tasks with the high load level. If a remaining available processing capacity of the core processing units with the high operation capability is not sufficient to meet the demands of the tasks with the high load level on the processor resources, core processing units with the medium operation capability will be allocated to the tasks with the high load level. Continue until the allocation is completed.

According to the implementation of the disclosure, the n tasks can be classified into the m task sets with each task set having a load level by acquiring the n tasks running in parallel in the system. The demands of the current task set on processor resources can also be calculated according to the number of the tasks in the current task set and the load coefficient corresponding to the load level of the current task set and then the demands on the processor resources can be allocated for the current task set. With aid of the above, it is possible to distinguish the tasks running simultaneously in a fine way, and allocate processors with different levels for different tasks for processing according to different load levels. Therefore, the processor resources can be utilized efficiently and efficiency in processing multiple tasks running in parallel can be improved.

Figure 2:
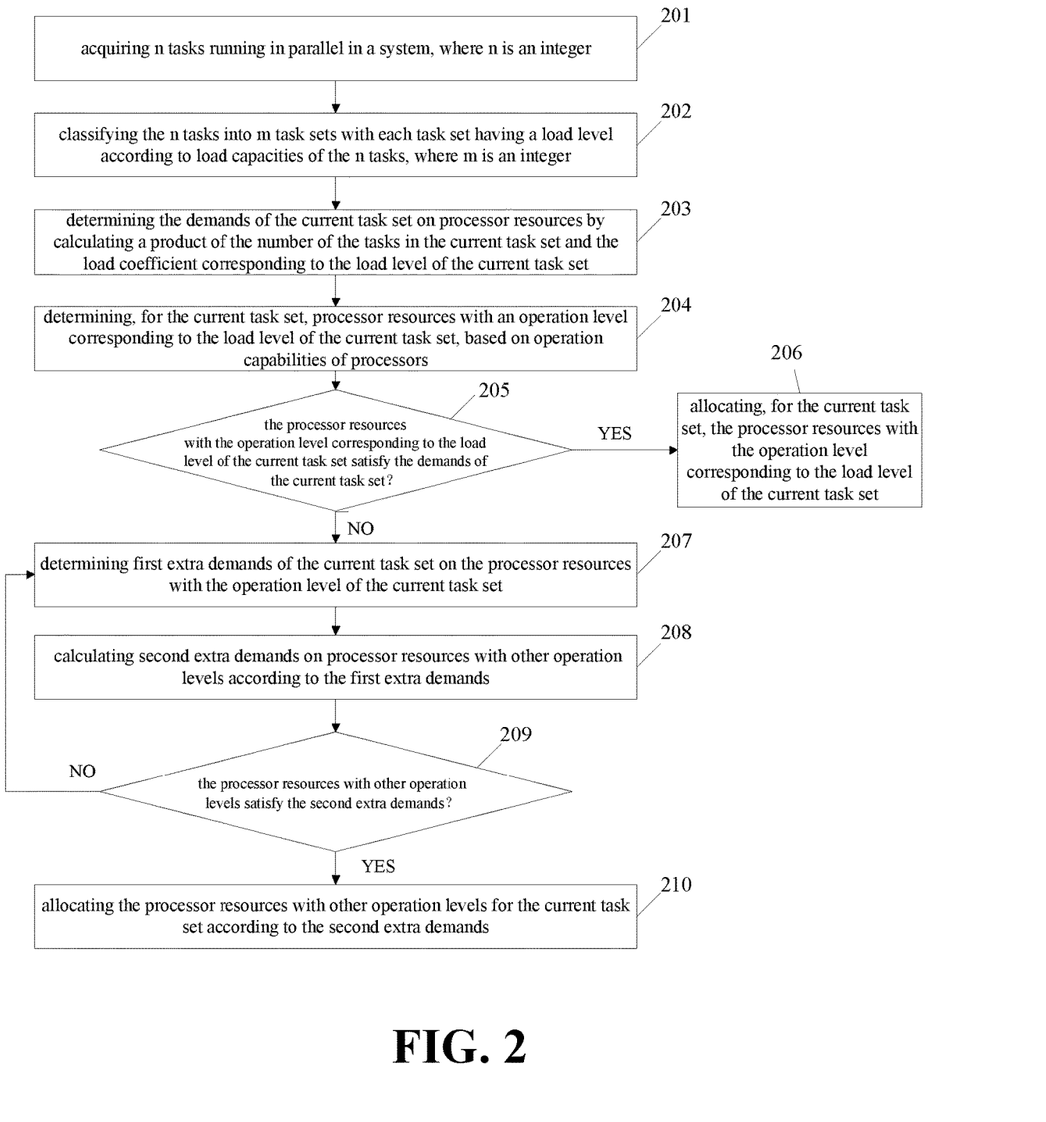
FIG. 2 is a schematic flow chart illustrating another method for allocating processor resources according to an implementation of the present disclosure.

FIG. 2 is a schematic flow chart illustrating another method for allocating processor resources according to an implementation of the present disclosure. The method can be implemented by a terminal device. As illustrated in FIG. 2, the method at least includes the following operations.

At block 201, n tasks running in parallel in a system are acquired, where n is an integer.

In one implementation, the terminal device acquires the n tasks running in parallel in the system. As one implementation, the terminal device may acquire the n tasks running in parallel in the system in real time, and may also acquire, in a period, the n tasks running in parallel during the period. The present disclosure is not limited thereto. Among them, the n tasks running in parallel in the system may represent n processes or threads of an application, and may also represent other tasks that a processor can handle. The n tasks can contain different load capacities, and can be generated by the same application or different applications.

At block 202, the n tasks are classified into m task sets with each task set having a load level according to load capacities of the n tasks, where m is an integer.

In one implementation, based on different load capacities of the n tasks, the n tasks are classified into the m task sets with each task set having a load level according to load capacities of the n tasks. As one implementation, a mapping relationship table between load capacity ranges and load levels may be preset, where one load capacity range corresponds to one load level. The n tasks are classified according to the load capacities thereof. When a load capacity of a task falls within a load capacity range, a load level of the task can be determined, where the load level of the task corresponds to the load capacity range above. After determining load levels of the n tasks in the foregoing manner, tasks of the same load level may be selected to form a task set with the load level. The total number of tasks in the m task sets with each task set having a load level is n. Through the above manner, tasks that the system needs to process at the same time and the number of tasks at different load levels can be determined. Therefore, different processor resources can be allocated for different tasks based on different load levels.

At block 203, the demands of the current task set on processor resources is determined by calculating a product of the number of the tasks in the current task set and the load coefficient corresponding to the load level of the current task set.

In one implementation, after the m task sets with each task set having a load level are determined, the demands of the current task set on processor resources are determined according to the number of the tasks in the current task set and the load coefficient corresponding to the load level of the current task set. As one implementation, different load levels correspond to different load coefficients, such that the demands of the current task set on processor resources can be calculated according to the load coefficient and the number of the tasks in the current task set. The processor resources described in the implementation of the present disclosure may be central processing units (CPUs) or graphics processing units (GPUs), which can include core processing units integrated in the processor. The core processing units with different operation capabilities will have different load capacities for operation, that is, the stronger the operation capability, the larger the load capacities for operation. The processor resources can include multiple processors, and multiple core processing units may be integrated in each processor. The core processing units may have the same operation capability or different operation capabilities.

The following describes three load levels are configured as an example. The three load levels are a high load level, a medium load level, and a low load level. Tasks with the high load level require relatively more processor resources; for example, they need to be processed by a single core processing unit. Accordingly, tasks with the medium load level require relatively medium processor resources; for example, one or two tasks are allowed to share a single core processing unit; and tasks with the low load level require relatively less processor resources; for example, multiple tasks are allowed to share a single core processing unit. The above-mentioned core processing units may have the same operation capability. Alternatively, core processing units allocated to the tasks with the high load level have a high operation capability, that is, have a high operation level; and core processing units allocated to the tasks with the medium load level or the low load level have a medium operation capability or a low operation capability, that is, have a medium operation level or a low operation level.

For example, a load coefficient $P\_big$ corresponding to the high load level may be 1, indicating that each task requires a single core processing unit for processing, and the number of the tasks with the high load level is $Rq\_big$; in this case, demands on processor resources for a task set with the high load level are determined as $CPU\_big=P\_mid*Rq\_big$. Similarly, a load coefficient $P\_mid$ corresponding to the medium load level may be 0.6 and the number of the tasks with the medium load level is $Rq\_mid$; in this case, demands on processor resources for a task set with the medium load level are determined as $CPU\_mid=P\_mid*Rq\_mid$. A load coefficient $P\_small$ corresponding to the low load level may be 0.2 and the number of the tasks with the low load level is $Rq\_small$; in this case, demands on processor resources for a task set with the low load level are determined as $CPU\_mid=P\_mid*Rq\_mid$.

That is, the load coefficient can be understood as the number of core processing units required for a task corresponding to the load coefficient. Assume that each core processing unit in the processor has the same operation capability, the demands of the task can be determined according to the load coefficient. For example, for a task with the high load level, the task has a load coefficient of 1. It means that, a single core processing unit that does not process other tasks is required for processing the task with the high load level specifically. For a task with the medium load level, the task has a load coefficient of 0.6. It indicates that, 60% of a core processing unit is required for processing the task with the medium load level and the remaining 40% of the core processing unit may be used to process other tasks with the medium load level. Similarly, for a task with the low load level, the task has a load coefficient of 0.2. It indicates that, 20% of a core processing unit is required for processing the task with the low load level and the remaining 80% of the core processing unit may be used to process other tasks with the low load level.

After determining the demands of each task in the current task set, the demands of the current task set can be determined according to the number of the tasks in the current task set. For the task set with the high load level, assume the number of the tasks thereof is 5; in this situation, the demands of the task set with the high load level will be 5. For the task set with the medium load level, assume the number of the tasks thereof is 5; in this situation, the demands of the task set with the medium load level will be 3. For the task set with the low load level, assume the number of the tasks thereof is 5; in this situation, the demands of the task set with the low load level will be 1. The core processing units above can be understood as having the same operation capability or capable of carrying the same demands of tasks.

As mentioned above, the demands can be the total load capacity of the current task set. Based on this, alternatively, at block 203, the implementations of the disclosure also provide another implementation to determine the demands of the current task set on processor resources.

A total load capacity of the current task set is calculated according to the number of the tasks in the current task set and load capacities of the tasks in the current task set. The total load capacity of the current task set may be determined as the demands of the current task set on the processor resources. In this case, processor resources such as core processing units that can carry the total load capacity of the current task set are allocated for the current task set.

At block 204, determine, for the current task set, processor resources with an operation level corresponding to the load level of the current task set, based on operation capabilities of processors.

In one implementation, after determining the demands on the processor resources for the task sets with different load levels, the processor resources can be classified as well. As one implementation, for the current task set, the processor resources with the operation level corresponding to the load level of the current task set can be determined based on the operation capabilities of the processors. Processors (including core processing units) can be classified according to operation capabilities to obtain processor resources with different operation levels. For example, operation levels of processor resources can be divided into a high operation level, a medium operation level, and a low operation level. It is to be noted that, operation levels of processor resources correspond to load levels of task sets, that is, the task set with the high load level corresponds to processor resources with the high operation level, the task set with the medium load level corresponds to processor resources with the medium operation level, and the task set with the low load level corresponds to processor resources with the low operation level. As one implementation, the operation levels of the processor resources may be further subdivided into more levels, load levels of task sets may correspond to one or more operation levels of processor resources, and the like. The disclosure is not particularly limited. Processor resources of the same operation level may include at least one core processing unit, where the core processing unit may come from one processor or different processors.

The following describes an implementation in detail.

Assume that the smallest unit of processor resources that can be allocated for a task set is a core processing unit. The operation level of the core processing unit may be determined according to the operation capability of the core processing unit of the processor resources, and the core processing units of the same operation level may be assembled into one unit set. For example, the processor resources are divided into a unit set with a high operation level, a unit set with a medium operation level, and a unit set with a low operation level. Here, the operation capability of the core processing unit can also be understood as at least one of: the capability of the core processing unit to carry a load capacity, or the efficiency in processing tasks of the core processing unit. For example, if a core processing unit of the processor resources can carry a large load capacity, has high efficiency in processing tasks, or has a high comprehensive result via considering the load capacity that can be carried and the efficiency in processing tasks, the core processing unit above can be determined as a core processing unit with the high operation level. Furthermore, the unit set with the high operation level can be formed.

The current task set can be allocated for a unit set with an operation level corresponding to the load level of the current task set based on the load level of the current task set. For example, the task set with the high load level corresponds to the unit set with the high operation level.

Alternatively, a unit set may be allocated for the current task set according to the total load capacity of the current task set. For example, if the task set with the medium load level has the largest total load capacity, the unit set with the high operation level will be allocated for the task set with the medium load level.

At block 205, whether the processor resources with the operation level corresponding to the load level of the current task set satisfy the demands of the current task set is judged.

In one implementation, after determining, for the current task set, the processor resources with the operation level corresponding to the load level of the current task set, whether the processor resources with the operation level corresponding to the load level of the current task set satisfy the demands of the current task set on processor resources is judged. Compare remaining available resources of the processor resources with the demands of the current task set on processor resources, if the remaining available resources of the processor resources are greater than the demands, it indicates that the processor resources satisfy the demands of the current task set on processor resources; otherwise, it indicates that the processor resources do not satisfy the demands of the current task set on processor resources.

Moreover, the remaining available resources of the processor resources can be determined according to the demands of the current task set.

For one example, if the demands of the current task set are the number of core processing units, the remaining available resources of the processor resources are the number of remaining core processing units that are not processing tasks in the unit set corresponding to the current task set. For example, the demands of the task set with the high load level are five core processing units. Assume that the task set with the high load level corresponds to the unit set with the high operation level, whether the number of available core processing units in the unit set with the high operation level of the processor resources is equal to five is judged. If yes, the unit set with the high operation level is selected to process the task set with the high load level, that is, advance to block 206; otherwise, the number of available core processing units in a unit set with other operation levels is determined, that is, proceed to block 207.

For another example, if the demands of the current task set are the total load capacity, the remaining available resources of the processor resources are a load capacity that can be carried by various core processing units in the unit set corresponding to the current task set. The total load capacity of the task set with the high load level is N load units, where N is a positive integer and the load unit is a minimum load that can be independently processed. Assume that the task set with the high load level corresponds to the unit set with the high operation level, it is necessary to determine the number of load units that can be carried by the unit set with the high operation level. For example, if a part of the space of a core processing unit in the unit set has been occupied for other tasks, the number of load units that the remaining space of the core processing unit can carry will be determined; or another core processing unit in the unit set is not processing tasks, that is, the entire space of the core processing unit is available, the number of load units that the entire space of the core processing unit can carry will be determined. Though the above manner, whether the number of load units that can be carried by the unit set with the high operation level is equal to N can be judged. If yes, advance to block 206; otherwise, proceed to block 207.

At block 206, the processor resources with the operation level corresponding to the load level of the current task set are allocated for the current task set, based on a judgment that the processor resources with the operation level corresponding to the load level of the current task set satisfy the demands of the current task set.

In one implementation, based on a judgment that the processor resources with the operation level corresponding to the load level of the current task set satisfy the demands of the current task set, the processor resources with the operation level corresponding to the load level of the current task set can be allocated for the current task set. In this way, the processor resources with different operation levels can be fully utilized, and tasks in the current task set can be processed quickly and efficiently.

At block 207, first extra demands of the current task set on the processor resources with the operation level of the current task set are determined, based on a determination that the demands of the current task set are not satisfied.

In one implementation, based on a determination that the demands of the current task set are not satisfied, extra demands of the current task set on processor resources are determined first. As one implementation, the following describes the processor resources with the medium operation level corresponding to the task set with the medium load level as an example. Assume that demands on processor resources for the task set with the medium load level are CPU_mid and remaining available resources of the processor resources with the medium operation level are Num_mid, where Num_mid<CPU_mid, extra demands on the processor resources with the medium operation level for the task set with the medium load level will be CPU_mid_ex=CPU_mid−Num_mid. And then the extra demands are determined as the first extra demands.

At block 208, second extra demands on processor resources with other operation levels are calculated according to the first extra demands.

In one implementation, if the remaining available resources of the processor resources with the operation level corresponding to the load level of the current task set fail to meet the demands of the current task set on processor resources, that is, the processor resources with the operation level corresponding to the load level of the current task set can only handle partial demands of the current task set, for extra demands, processor resources with other operation levels may help. As operation capabilities of processors with different operation levels are different, the first extra demands at the operation level corresponding to the load level of the current task set can be converted into the second extra demands at other operation levels.

As one implementation, block 208 can be achieved as follows. A ratio of a first operation coefficient corresponding to the operation level to a second operation coefficient corresponding to other operation levels is calculated. A product of the ratio and the first extra demands is calculated as the second extra demands.

The following describes the task set with the medium load level as an example. If the processor resources with the medium operation level are not sufficient to meet the demands of the task set with the medium load level, whether processor resources with an operation level higher than the medium operation level can meet extra demands of the task set with the medium load level is judged first. Among them, different operation levels correspond to different operation coefficients. For example, an operation coefficient Capacity_big of the high operation level is 1, an operation coefficient Capacity_mid of the middle operation level is 0.5, and an operation coefficient of the low operation level Capacity_small is 0.2. The formula CPU_big_ex=CPU_mid_ex*Capacity_mid/Capacity_big can be used to convert the first extra demands of the task set with the medium load level on the processor resources with the medium operation level into second extra demands of the task set with the medium load level on the processor resources with the high operation level.

At block 209, whether the processor resources with other operation levels satisfy the second extra demands is judged.

In one implementation, after calculating the second extra demands on the processor resources with other operation levels, whether the processor resources with other operation levels satisfy the second extra demands can be judged. That is, remaining available resources of the processor resources with other operation levels are compared with the second extra demands; if the remaining available resources are less than the second extra demands, it shows that the processor resources with other operation levels do not satisfy the second extra demands; otherwise, it shows that the processor resources with other operation levels satisfy the second extra demands. It is to be noted that, the remaining available resources of the processor resources with other operation levels indicate remaining resources that can handle tasks after parts of the processor resources with other operation levels have been allocated for a task set with a load level corresponding to other operation levels.

At block 210, the processor resources with other operation levels are allocated for the current task set according to the second extra demands, based on a judgment that the processor resources with other operation levels satisfy the second extra demands.

In one implementation, if the processor resources with other operation levels can process the extra demands of the current task set on processor resources with the load level, not only the processor resources with the operation level corresponding to the load level of the current task set are allocated for the current task set with the load level, the processor resources with other operation levels are also allocated for the current task set with the load level.

In the case that the processor resources with other operation levels still cannot handle the extra demands of the current task set on processor resources with the load level, repeat block 207~block 209.

For example, if the processor resources with the medium operation level fail to satisfy the demands of the task set with the medium load level, whether processor resources with an operation level higher than the medium operation level can satisfy the extra demands of the task set with the medium load level will be judged first. In the implementations of the disclosure, first extra demands of the task set with the medium load level on the processor resources with the medium operation level are converted into second extra demands of the task set with the medium load level on the processor resources with the high operation level by using the following formula: CPU_big_ex=CPU_mid_ex*Capacity_mid/Capacity_big.

In this case, assume that Num_big−CPU_big represents remaining available resources of the processor resources with the high operation level; the value of CPU_big_ex is then compared with the value of Num_big−CPU_big.

If the value of CPU_big_ex is greater than the value of Num_big−CPU_big, it means that the remaining available resources of the processor resources with the high operation level still fail to satisfy the extra demands on the processor resources for the task set with the medium load level. In this situation, after the task set with the medium load level takes the remaining available resources of the processor resources with the high operation level, remaining extra demands on the processor resources for the task set with the medium load level can be calculated with reference to block 208. As one implementation, the remaining extra demands are determined as the first extra demands CPU_big_ex=(Num_big−CPU_big), and the second extra demands on the processor resources with the low operation level are determined from the processor resources with the low operation level. And the second extra demands can be calculated via the following formula: CPU_small_ex=(CPU_big_ex−(Num_big−CPU_big))*Capacity_big/Capacity_small.

The above operations will be continued until the allocation of the demands on the processor resources for the task set with the medium load level is completed. Therefore, it is possible to further utilize the processor resources to the most.

According to the implementation of the disclosure, the n tasks can be classified into the m task sets with each task set having a load level by acquiring the n tasks running in parallel in the system. The demands of the current task set on processor resources can also be calculated according to the number of the tasks in the current task set and the load coefficient corresponding to the load level of the current task set and then the demands on the processor resources can be allocated for the current task set. By adopting the above, the tasks running simultaneously can be distinguished in a fine way, and processors with different levels are allocated for different tasks for further processing according to different load levels. Therefore, the processor resources can be utilized efficiently and efficiency in processing multiple tasks running in parallel can be improved.

Figure 3:
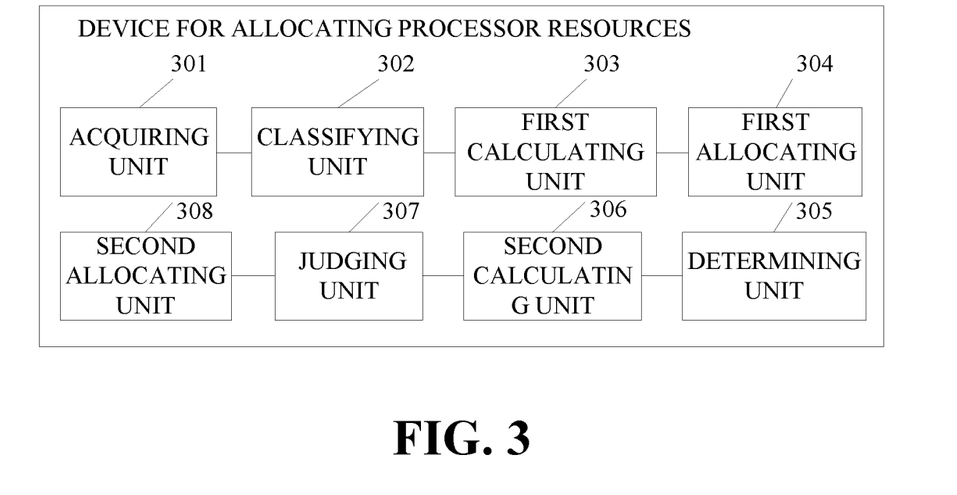
FIG. 3 is a block diagram illustrating functional units of a device for allocating processor resources according to an implementation of the present disclosure.

The following describes device implementations of the disclosure. The device implementations of the disclosure are configured to execute the methods achieved by the method implementations of the disclosure. FIG. 3 is a block diagram illustrating functional units of a device for allocating processor resources according to an implementation of the present disclosure. The device may include an acquiring unit 301, a classifying unit 302, a first calculating unit 303, and a first allocating unit 304. These components can be integrated into a processor, such as the processor of FIG. 4 or FIG. 5.

The acquiring unit 301 is configured to acquire n tasks running in parallel in a system, where n is an integer. The classifying unit 302 is configured to classify the n tasks into m task sets with each task set having a load level according to load capacities of the n tasks, where m is an integer. The first calculating unit 303 is configured to calculate demands of a current task set on processor resources according to the number of tasks in the current task set and a load coefficient corresponding to a load level of the current task set. The first allocating unit 304 is configured to allocate the demands on the processor resources for the current task set.

The first calculating unit 303 is configured to determine the demands of the current task set on processor resources by calculating a product of the number of the tasks in the current task set and the load coefficient corresponding to the load level of the current task set, where the demands is the number of core processing units of the processor resources.

The first allocating unit 304 is configured to determine, for the current task set, a unit set having an operation level corresponding to the load level of the current task set, based on operation capabilities of processors, where the unit set includes core processing units with the operation level, to judge whether the number of available core processing units in the unit set satisfies the demands of the current task set, and to allocate, for the current task set, the available core processing units that satisfy the demands of the current task set, based on a judgment that the number of the available core processing units in the unit set satisfies the demands of the current task set.

The first calculating unit 303 is configured to calculate a total load capacity of the current task set according to load capacities of the tasks in the current task set, the number of the tasks in the current task set, and the load coefficient corresponding to the load level of the current task set, and to determine the total load capacity of the current task set as the demands of the current task set.

The first allocating unit 304 is configured to: determine, for the current task set, a unit set having an operation level corresponding to the load level of the current task set based on operation capabilities of processors, where the unit set includes core processing units with the operation level, determine a load capacity that can be carried by each core processing unit in the unit set, determine a total load capacity that can be carried by the unit set according to the load capacity that can be carried by each core processing unit, judge whether the total load capacity that can be carried by the unit set satisfies the demands of the current task set, and allocate, for the current task set, available core processing units that can carry the demands of the current task set, based on a judgment that the total load capacity that can be carried by the unit set satisfies the demands of the current task set.

As one implementation, the device further includes a determining unit 305, a second calculating unit 306, a judging unit 307, and a second allocating unit 308.

The determining unit 305 is configured to determine first extra demands of the current task set on processor resources with the operation level corresponding to the load level of the current task set, based on a determination that the demands of the current task set are not satisfied. The second calculating unit 306 is configured to calculate second extra demands on processor resources with other operation levels according to the first extra demands. The judging unit 307 is configured to judge whether the processor resources with other operation levels satisfy the second extra demands. The second allocating unit 308 is configured to allocate, for the current task set, the processor resources with other operation levels, according to the second extra demands, when the judging unit 307 judges that the processor resources with other operation levels satisfy the second extra demands.

The second calculating unit 306 is configured to: calculate a ratio of a first operation coefficient corresponding to the operation level to a second operation coefficient corresponding to other operation levels, and calculate a product of the ratio and the first extra demands as the second extra demands.

According to the implementation of the disclosure, the n tasks can be classified into the m task sets with each task set having a load level by acquiring the n tasks running in parallel in the system. The demands of the current task set on processor resources can also be calculated according to the number of the tasks in the current task set and the load coefficient corresponding to the load level of the current task set and then the demands on the processor resources can be allocated for the current task set. By adopting the above, the tasks running simultaneously can be distinguished in a fine way, and processors with different levels are allocated for different tasks for further processing according to different load levels. Therefore, it is possible to utilize the processor resources efficiently and improve efficiency in processing multiple tasks running in parallel.

It is to be noted that, the terminal device described in the device implementation of the disclosure is presented in the form of functional units. The term "unit" used herein should be understood as the broadest meaning as possible, and an object for implementing functions defined by each "unit" may be, for example, an integrated circuit (ASIC), a single circuit, a processor (shared, dedicated, or chipset) and a memory for executing one or more software or firmware programs, a combinational logic circuit, and/or other suitable components that can achieve the above described functions.

According to implementations of the disclosure, a terminal device is provided. The terminal device includes at least one processor and a computer readable storage, coupled to the at least one processor and storing at least one computer executable instruction thereon which, when executed by the at least one processor, causes the at least one processor to carry out the forgoing methods.

Figure 4:
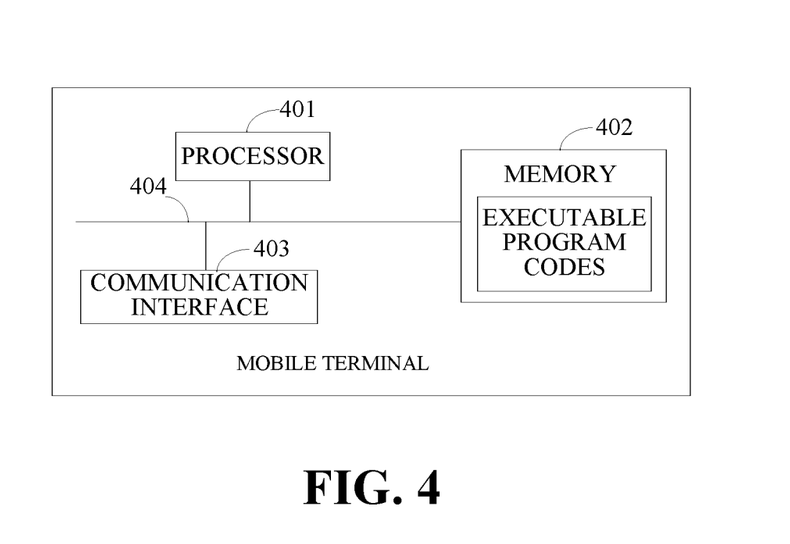
FIG. 4 is a schematic structural diagram illustrating a terminal device according to an implementation of the present disclosure.

An implementation of the disclosure further provides another terminal device. As illustrated in FIG. 4, the terminal device includes: a processor 401, a memory 402, a communication interface 403, and a communication bus 404. The processor 401, the memory 402, and the communication interface 403 are connected via the communication bus 404 and can achieve mutual communication. The processor 401 is configured to control wireless communication with an external cellular network via communication interface 403. The processor 401 includes a controller and processor resources, and processor resources may include one or more processors or one or more core processing units. Among them, the controller is configured to allocate processor resources for a task. The communication interface 403 includes, but is not limited to, an antenna, an amplifier, a transceiver, a coupler, an LNA (low noise amplifier), a duplexer, and the like. The memory 402 includes at least one of: a random access memory, a non-volatile memory, and an external memory. The memory 402 is configured to store executable program codes. The executable program codes can guide the controller in the processor 401 to execute the methods disclosed in the method implementations of the disclosure. The method includes the following operations.

Acquire n tasks running in parallel in a system, where n is an integer.

The n tasks are classified into m task sets with each task set having a load level according to load capacities of the n tasks, where m is an integer.

Demands of a current task set on processor resources are calculated according to the number of tasks in the current task set and a load coefficient corresponding to a load level of the current task set.

The demands on the processor resources are allocated for the current task set.

According to the implementation of the disclosure, the n tasks can be classified into the m task sets with each task set having a load level by acquiring the n tasks running in parallel in the system. The demands of the current task set on processor resources can also be calculated according to the number of the tasks in the current task set and the load coefficient corresponding to the load level of the current task set and then the demands on the processor resources can be allocated for the current task set. By adopting the above, the tasks running simultaneously can be distinguished in a fine way, and processors with different levels are allocated for different tasks for further processing according to different load levels. Therefore, the processor resources can be utilized efficiently and efficiency in processing multiple tasks running in parallel can be improved.

In addition, the executable program codes stored in the memory 402 are further configured to execute related operations of the method illustrated in FIG. 2. The disclosure will not be described in further details.

Figure 5:
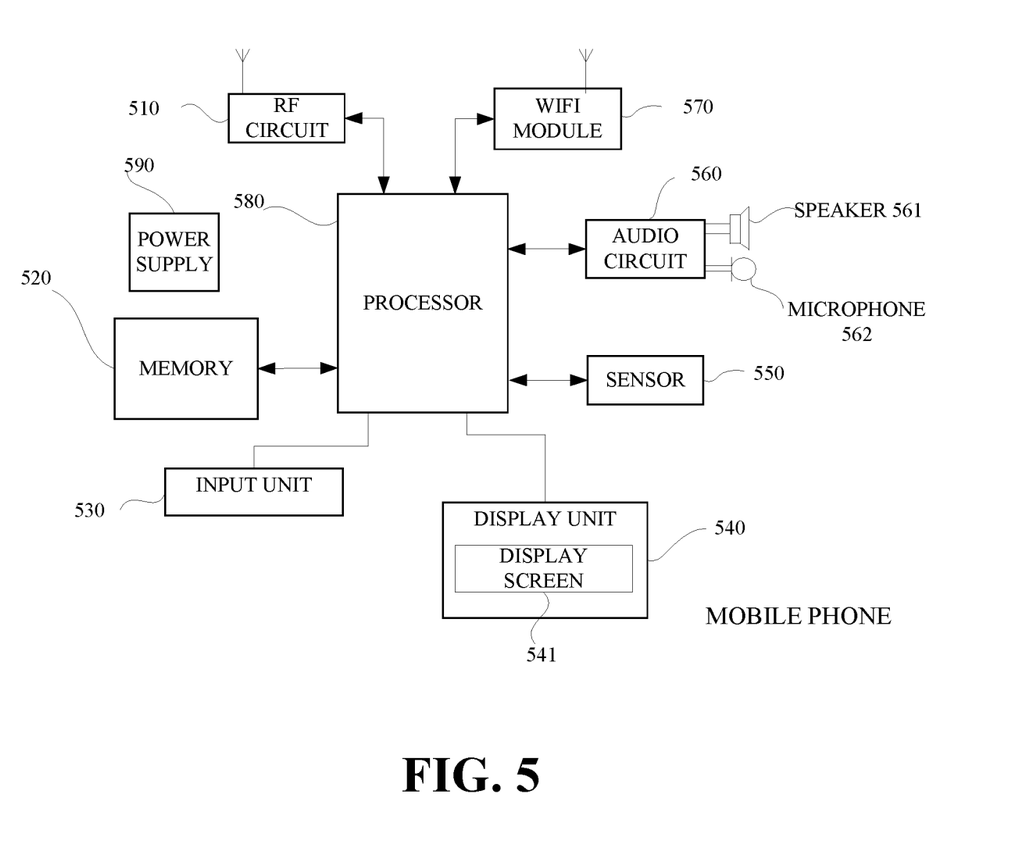
FIG. 5 is a schematic structural diagram illustrating another terminal device according to an implementation of the present disclosure.

An implementation of the disclosure further provides yet another terminal device. As illustrated in FIG. 5, only parts related to the implementations of the present disclosure are illustrated for ease of description. For technical details not described, reference may be made to the method implementations of the present disclosure. The terminal device may be any terminal device, such as a mobile phone, a tablet computer, a personal digital assistant (PDA), a point of sale terminal (POS), an on-board computer and the like. The following describes the mobile phone as an example of the terminal device.

FIG. 5 is a block diagram of a part of a structure of a mobile phone related to a terminal device according to an implementation of the present disclosure. As illustrated in FIG. 5, the mobile phone includes a RF (radio frequency) circuit 510, a memory 520, an input unit 530, a display unit 540, a sensor 550, an audio circuit 560, a Wi-Fi (wireless fidelity) module 570, a processor 580, a power supply 590 and other components. Those skilled in the art can understand that the structure of the mobile phone illustrated in FIG. 5 does not constitute any limitation on a mobile phone. The mobile phone configured to implement technical solutions of the disclosure may include more or fewer components than illustrated or may combine certain components or different components.

In the following, various components of the mobile phone will be described in detail with reference to FIG. 5.

The RF circuit 510 is configured to transmit or receive information. Generally, the RF circuit 510 includes but is not limited to an antenna, at least one amplifier, a transceiver, a coupler, a low noise amplifier (LNA), a duplexer, and the like. In addition, the RF circuit 510 may also communicate with the network and other devices via wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS) and so on.

The memory 520 is configured to store software programs and modules, and the processor 580 is configured to execute various function applications and data processing of the mobile phone by running the software programs and the modules stored in the memory 520. The memory 520 mainly includes a program storage area and a data storage area. The program storage area may store an operating system, application programs required for at least one function and so on. The data storage area may store data (such usage parameters of an application) created according to use of the mobile phone, and so on. In addition, the memory 520 may include a high-speed RAM, and may further include a non-volatile memory such as at least one disk storage device, a flash device, or other non-volatile solid storage devices.

The input unit 530 may be configured to receive input digital or character information and generate key signal input associated with user setting and function control of the mobile phone. As one implementation, the input unit 530 may include a fingerprint recognition module 531 and other input devices 532. The fingerprint recognition module 531 can collect fingerprint data of the user. In addition to the fingerprint recognition module 531, the input unit 530 may further include other input devices 532. As one implementation, the other input devices 532 may include, but not limit to, one or more of a touch screen, a physical key, a function key (such as a volume control key, a switch key, etc.), a trackball, a mouse, a joystick and the like.

The display unit 540 is configured to display information input by the user or information provided for the user or various menus of the mobile phone. The display unit 540 may include a display screen 541, and alternatively, the display screen 541 may be in the form of a liquid crystal display (LCD), an organic light-emitting diode (OLED) and so on.

The mobile phone may also include at least one sensor 550, such as a light sensor, a motion sensor, and other sensors. As one implementation, the light sensor may include an ambient light sensor and a proximity sensor, among which the ambient light sensor may adjust the brightness of the display screen 541 according to ambient lights, and the proximity sensor may turn off the display screen 541 and/or backlight when the mobile phone reaches nearby the ear. As a kind of motion sensor, the accelerometer sensor can detect the magnitude of acceleration in all directions (typically three axes) and when the mobile phone is stationary, the accelerometer sensor can detect the magnitude and direction of gravity; the accelerometer sensor can also identify mobile-phone gestures related applications (such as vertical and horizontal screen switch, related games, magnetometer attitude calibration), or the accelerometer sensor can be used for vibration-recognition related functions (such as a pedometer, percussion) and so on. The mobile phone can also be equipped with a gyroscope, a barometer, a hygrometer, a thermometer, and infrared sensor and other sensors, and it will not be repeated herein.

The audio circuit 560, the speaker 561, the microphone 562 may provide an audio interface between the user and the mobile phone. The audio circuit 560 may convert the received audio data into electrical signals and transfer the electrical signals to the speaker 561; thereafter the speaker 561 converts the electrical signals into sound signals to output. On the other hand, the microphone 562 converts the received sound signals into electrical signals, which will be received and converted into audio data by the audio circuit 560 to output. The audio data is then processed and transmitted by the processor 580 via a RF circuit 510 to another mobile phone for example, or, the audio data is output to the memory 520 for further processing.

Wi-Fi belongs to a short-range wireless transmission technology. With aid of the Wi-Fi module 570, the mobile phone may assist the user in E-mail receiving and sending, webpage browsing, access to streaming media and the like. Wi-Fi provides users with wireless broadband Internet access. Although the Wi-Fi module 570 is illustrated in FIG. 5, the Wi-Fi module 570 is not essential to the mobile phone and can be omitted according to actual needs without departing from the essential nature of the present disclosure.

The processor 580 is the control center of the mobile phone, and is configured to connect various parts of the whole mobile phone through various interfaces and lines, run or execute software programs and/or modules stored in the memory 520, and invoke data stored in the memory 520 to perform various functions of the mobile phone and process data, thereby monitoring the mobile phone as a whole. In at least one implementation, the processor 580 may include one or more processing units. For example, the processor 580 may integrate an application processor and a modem processor, where the application processor is configured to handle the operating system, the user interface, the application, and so on, and the modem processor is mainly configured to process wireless communication. It will be understood that the above-mentioned modem processor may not be integrated into the processor 580.

The mobile phone also includes a power supply 590 (e.g., a battery) that supplies power to various components. For instance, the power supply 590 may be logically connected to the processor 580 via a power management system to enable management of charging, discharging, and power consumption through the power management system.

Although not illustrated, the mobile phone may include a camera, a Bluetooth module, etc., and the disclosure will not elaborate herein.

The method of the foregoing implementations illustrated in FIG. 1 or FIG. 2 can be realized based on the structure of the mobile phone.

The functions of the units illustrated in FIG. 3 can be achieved based on the structure of the mobile phone.

Implementations of the present disclosure also provide a non-transitory computer readable storage medium. The non-transitory computer readable storage medium can store programs which, when executed by a computer, are operable with the computer to execute all or part of the operations of any of the methods described in the foregoing method implementations.

For example, the programs are operable with the computer to execute the following actions. Acquire n tasks running in parallel in a system, where n is an integer. The n tasks are classified into m task sets with each task set having a load level according to load capacities of the n tasks, where m is an integer. Demands of a current task set on processor resources are determined according to at least one of the number of tasks in the current task set and a load coefficient corresponding to a load level of the current task set. The demands on the processor resources are allocated for the current task set.

The demands on the processor resources can be allocated as follows. Determine, for the current task set, processor resources with an operation level corresponding to the load level of the current task set, based on operation capabilities of processors. Determine whether the processor resources with the operation level corresponding to the load level of the current task set satisfy the demands of the current task set. Allocate, for the current task set, the processor resources with the operation level corresponding to the load level of the current task set, based on a determination that the processor resources with the operation level corresponding to the load level of the current task set satisfy the demands of the current task set.

The demands of the current task set can refer to the number of core processing units of the processor resources obtained by calculating a product of the number of the tasks in the current task set and the load coefficient corresponding to the load level of the current task set. Alternatively, the demands of the current task set can refer to a total load capacity of the current task set obtained according to load capacities of the tasks in the current task set and the number of the tasks in the current task set.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random-access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), Disk or compact disc (CD), and so on.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method for allocating processor resources, comprising:
   acquiring n tasks running in parallel in a system, n being an integer;
   classifying the n tasks into m task sets with each task set having a load level according to load capacities of the n tasks, m being an integer;
   determining demands of a current task set on the processor resources according to at least one of a number of tasks in the current task set or a load coefficient corresponding to a load level of the current task set;
   determining first extra demands of the current task set on the processor resources with an operation level corresponding to the load level of the current task set;
   determining a ratio of a first operation coefficient corresponding to the operation level to a second operation coefficient corresponding to other operation levels;
   determining a product of the ratio and the first extra demands as second extra demands;
   determining whether the processor resources with the other operation levels satisfy the second extra demands; and
   based on a determination that the processor resources with the other operation levels satisfy the second extra demands, allocating the processor resources with the other operation levels for the current task set according to the second extra demands.

2. The method of claim 1, wherein the demands are a number of core processing units of the processor resources, and determining the demands of the current task set on the processor resources according to the at least one of the number of the tasks in the current task set or the load coefficient corresponding to the load level of the current task set comprises:
   determining the demands of the current task set on the processor resources by calculating a product of the number of the tasks in the current task set and the load coefficient corresponding to the load level of the current task set.

3. The method of claim 2, wherein allocating the demands on the processor resources for the current task set comprises:
   determining, for the current task set, a unit set having an operation level corresponding to the load level of the current task set, based on operation capabilities of processors, wherein the unit set comprises core processing units with the operation level; and
   allocating, for the current task set, available core processing units that satisfy the demands of the current task set, when a number of the available core processing units in the unit set is greater than or equal to the demands of the current task set.

4. The method of claim 3, wherein determining the first extra demands of the current task set on the processor resources with the operation level corresponding to the load level of the current task set is in response to a determination that a number of the available core processing units in the unit set is less than the demands of the current task set.

5. The method of claim 1, wherein the demands are a total load capacity of the current task set, and determining the demands of the current task set on the processor resources according to the at least one of the number of tasks in the current task set or a load coefficient corresponding to a load level of the current task set comprises:
   determining the total load capacity of the current task set according to load capacities of the tasks in the current task set and the number of the tasks in the current task set.

6. The method of claim 5, further comprising:
determining, for the current task set, a unit set having an operation level corresponding to the load level of the current task set, based on operation capabilities of processors, wherein the unit set comprises core processing units with the operation level;
determining a load capacity capable of being carried by each core processing unit in the unit set;
determining a total load capacity capable of being carried by the unit set according to the load capacity capable of being carried by each core processing unit; and
allocating, for the current task set, available core processing units that can carry the demands of the current task set, when the total load capacity capable of being carried by the unit set is greater than or equal to the demands of the current task set.

7. The method of claim 6, wherein determining first extra demands of the current task set on the processor resources with the operation level corresponding to the load level of the current task is in response to a determination that the total load capacity that can be carried by the unit set is less than the demands of the current task set.

8. The method of claim 1, wherein the tasks comprise processes of an application or threads of an application.

9. The method of claim 1, wherein the load level includes any one of: a high load level, a medium load level, and a low load level.

10. A terminal device, comprising:
at least one processor; and
a memory, coupled to the at least one processor and storing at least one computer executable instruction thereon which, when executed by the at least one processor, causes the at least one processor to:
acquire n tasks running in parallel in a system, n being an integer;
classify the n tasks into m task sets with each task set having a load level according to load capacities of the n tasks, m being an integer;
determine demands of a current task set on processor resources according to at least one of a number of tasks in the current task set or a load coefficient corresponding to a load level of the current task set;
determine first extra demands of the current task set on the processor resources with an operation level corresponding to the load level of the current task set;
determine a ratio of a first operation coefficient corresponding to the operation level to a second operation coefficient corresponding to other operation levels;
determine a product of the ratio and the first extra demands as second extra demands;
determine whether the processor resources with the other operation levels satisfy the second extra demands; and
based on a determination that the processor resources with the other operation levels satisfy the second extra demands, allocating the processor resources with the other operation levels for the current task set according to the second extra demands.

11. The terminal device of claim 10, wherein the demands are a number of core processing units of the processor resources, and the at least one computer executable instruction causing the at least one processor to determine the demands of the current task set on the processor resources further the at least one processor to:
determine the demands of the current task set on the processor resources by calculating a product of the number of the tasks in the current task set and the load coefficient corresponding to the load level of the current task set.

12. The terminal device of claim 11, wherein the at least one computer executable instruction causing the at least one processor to allocate the demands further causes the at least one processor to:
determine, for the current task set, a unit set having an operation level corresponding to the load level of the current task set, based on operation capabilities of processors, wherein the unit set comprises core processing units with the operation level; and
allocate, for the current task set, available core processing units that satisfy the demands of the current task set, when a number of the available core processing units in the unit set is greater than or equal to the demands of the current task set.

13. The terminal device of claim 10, wherein the demands are a total load capacity of the current task set, and the at least one computer executable instruction causing the at least one processor to determine the demands of the current task set on the processor resources further causes the at least one processor to:
determine the total load capacity of the current task set according to load capacities of the tasks in the current task set and the number of the tasks in the current task set.

14. The terminal device of claim 13, wherein the at least one computer executable instruction causing the at least one processor to allocate the demands further causes the at least one processor to:
determine, for the current task set, a unit set having an operation level corresponding to the load level of the current task set, based on operation capabilities of processors, wherein the unit set comprises core processing units with the operation level;
determine a load capacity capable of being carried by each core processing unit in the unit set;
determine a total load capacity capable of being carried by the unit set according to the load capacity capable of being carried by each core processing unit; and
allocate, for the current task set, available core processing units that can carry the demands of the current task set, when the total load capacity that can be carried by the unit set is greater than or equal to the demands of the current task set.

15. The terminal device of claim 10, wherein the at least one computer executable instruction causing the at least one processor to allocate the demands further causes the at least one processor to:
determine the first extra demands of the current task set on the processor resources with the operation level corresponding to the load level of the current task set, when a unit set having an operation level corresponding to the load level of the current task set does not satisfy the demands of the current task set.

16. A non-transitory computer readable storage medium, storing at least one computer executable instruction thereon which, when executed by a computer, causes the computer to:
acquire n tasks running in parallel in a system, n being an integer;
classify the n tasks into m task sets with each task set having a load level according to load capacities of the n tasks, m being an integer;
determine demands of a current task set on processor resources according to at least one of a number of tasks in the current task set or a load coefficient corresponding to a load level of the current task set;

determine first extra demands of the current task set on the processor resources with an operation level corresponding to the load level of the current task set;

determine a ratio of a first operation coefficient corresponding to the operation level to a second operation coefficient corresponding to other operation levels;

determine a product of the ratio and the first extra demands as second extra demands; and based on a determination that the processor resources with the other operation levels satisfy the second extra demands, allocate the processor resources with the other operation levels for the current task set according to the second extra demands.

17. The non-transitory computer readable storage medium of claim 16, wherein the non-transitory computer readable storage medium causing the computer to allocate the demands further causes the computer to:

determine, for the current task set, the processor resources with an operation level corresponding to the load level of the current task set, based on operation capabilities of processors;

determine whether the processor resources with the operation level corresponding to the load level of the current task set satisfy the demands of the current task set; and allocate, for the current task set, the processor resources with the operation level corresponding to the load level of the current task set, based on a determination that the processor resources with the operation level corresponding to the load level of the current task set satisfy the demands of the current task set wherein the demands of the current task set comprise a number of core processing units of the processor resources obtained by calculating a product of the number of the tasks in the current task set and the load coefficient corresponding to the load level of the current task set, or are a total load capacity of the current task set obtained according to load capacities of the tasks in the current task set and the number of the tasks in the current task set.

* * * * *